(12) United States Patent
Chu

(10) Patent No.: US 6,482,878 B1
(45) Date of Patent: Nov. 19, 2002

(54) POLYURETHANE HOTMELT ADHESIVES WITH ACRYLIC COPOLYMERS AND THERMOPLASTIC RESINS

(75) Inventor: Wayne K. Chu, Tarrytown, NY (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/556,721

(22) Filed: Apr. 21, 2000

(51) Int. Cl.[7] ............ C09J 123/08; C09J 131/04; C09J 175/04
(52) U.S. Cl. ............ 524/271; 524/272; 525/125; 525/127; 525/131
(58) Field of Search .............. 525/127, 125, 525/131; 524/271, 272

(56) References Cited

U.S. PATENT DOCUMENTS

| | | |
|---|---|---|
| 3,931,077 A | 1/1976 | Uchigaki et al. |
| 4,585,819 A | 4/1986 | Reischle et al. |
| 4,775,719 A | 10/1988 | Markevka et al. |
| 4,808,255 A | 2/1989 | Markevka et al. ....... 156/307.3 |
| 5,021,507 A | 6/1991 | Stanley et al. |
| 5,189,096 A | 2/1993 | Boutillier et al. |
| 5,506,296 A | 4/1996 | Chenard et al. |
| 5,866,656 A | 2/1999 | Hung et al. .......... 525/123 |
| 5,922,805 A | 7/1999 | Bouttefort et al. .......... 524/590 |

FOREIGN PATENT DOCUMENTS

| EP | 0 827 995 A2 | 3/1998 | .......... C09J/175/04 |
|---|---|---|---|

*Primary Examiner*—Patricia A. Short
(74) *Attorney, Agent, or Firm*—Charles W. Almer

(57) ABSTRACT

This invention relates to solvent-free moisture curable one-part hot melt polyurethane adhesive or sealant compositions which are solid at room temperature. In one embodiment, the polyurethane adhesive or sealant composition comprises in percentages by weight (a) from about 20% to about 75% of a urethane prepolymer; (b) from about 1% to about 66% of a reactive, hydroxyl containing, or a nonreactive polymer formed from ethylenically unsaturated monomers; and (c) from about 20% to about 75% of a thermoplastic resin. In another embodiment, the polyurethane adhesive or sealant composition comprises, in percentages by weight of the polyurethane composition (a) from about 10% to about 90% of a urethane prepolymer; and (b) from about 5% to about 90% of a thermoplastic resin which is an ethylene vinylacetate/ethylene acrylate terpolymer.

10 Claims, No Drawings

POLYURETHANE HOTMELT ADHESIVES WITH ACRYLIC COPOLYMERS AND THERMOPLASTIC RESINS

FIELD OF THE INVENTION

This invention relates to solvent-free moisture curable one-part hot melt polyurethane adhesive or sealant compositions which are solid at room temperature. In one embodiment, the polyurethane adhesive or sealant composition comprises in percentages by weight (a) from about 20% to about 75% of a urethane prepolymer; (b) from about 1% to about 66% of a reactive, hydroxyl containing, or a nonreactive polymer formed from ethylenically unsaturated monomers; and (c) from about 20% to about 75% of a thermoplastic resin. In another embodiment, the polyurethane adhesive or sealant composition comprises, in percentages by weight of the. polyurethane composition (a) from about 10% to about 90% of a urethane prepolymer; and (b) from about 5% to about 90% of a thermoplastic resin which is an ethylene vinylacetate/ethylene acrylate terpolymer.

BACKGROUND OF THE INVENTION

Hot melt adhesives are 100% solid materials which do not contain or require any solvents and are solid at room temperature. On application of heat, the hot melt adhesive melts to a liquid or fluid state in which form it is applied to a substrate. On cooling, the hot melt adhesive regains its solid form, cures by a chemical crosslinking reaction, and thereby gains its cohesive strength. Hot melt adhesives have been prepared using specific materials such as polyurethanes.

Reactive hot melts are one-component, 100% solid, solvent-free urethane prepolymers. Unlike conventional hot melts that can be repeatedly heated from solid state and flowed to a liquid form, the reactive hot melt behaves as a thermoset and goes through an irreversible chemical reaction once dispensed in the presence of ambient moisture. The reactive hot melts are isocyanate terminated prepolymers that react with surface or ambient moisture in order to chain-extend, forming a new polyurethane polymer which offers performance superior to that obtained with conventional hot melt.

U.S. Pat. No. 3,931,077 (Uchigaki et al.) discloses a reactive hot melt-type adhesive composition comprising a reactive compound, a thermoplastic resin, and a tackifier. The reactive compound is a urethane prepolymer having terminal isocyanate groups at both ends resulting from the addition polymerization of a diisocyanate and a diol. The thermoplastic resin is an ethylene-vinylacetate co-polymer, an ethylene-acrylic acid copolymer, an ethyleneacrylate copolymer, an atactic polypropylene, or a polyethyleneterephthalate linear polymer. The tackifier is a hydrogenated abietic acid-type rosin or ester having its double bonds removed by hydrogenation in whole or in part, or a terpenephenol copolymer of a mono- or diterpene.

U.S Pat. No. 4,585,819 (Reischle et al.) discloses a fusion adhesive which comprises 20–90% by weight isocyanate prepolymer, and 5–50% by weight of a lower molecular weight synthetic resin selected from the group consisting of ketone resins, hydrogenated products of acetophenone, and condensation resins.

U.S. Pat. No. 4,775,719 (Markevka et al.'719) discloses a hot melt thermosetting urethane adhesive composition that can be extruded as a hot melt adhesive to form an initially high green strength hot melt bond and can moisture cure to a rigid moisture cure polyurethane bond. The urethane adhesive composition comprises (a) a film-forming thermoplastic ethylene-vinyl monomer copolymer which is a vinyl monomer of an acrylate monomer or a vinyl ester of a carboxylic acid compound; (b) a liquid polyurethane prepolymer composition; (c) a phenol-free, aromatic or aliphatic-aromatic polymer tackifier comprising a monomer selected from the group consisting of a $C_{4-6}$ diene, a styrenic monomer, an indene monomer, and dicyclopentadiene; and (d) an antioxidant.

U.S. Pat. No. 4,808,255 (Markevka et al.'255) discloses a reactive hot melt urethane adhesive composition having extended pot stability, bond heat stability, green strength and cured bond strength. The urethane adhesive composition comprises (a) a urethane prepolymer composition; (b) a structural thermoplastic ethylene vinyl monomer copolymer composition; and (c) a compatible aliphatic, aromatic or aliphatic-aromatic tackifying resin.

U.S. Pat. No. 5,021,507 (Stanley et al.) discloses the incorporation into a conventional polyurethane hot melt adhesive of low molecular weight polymers formed from ethylenically unsaturated monomers containing no reactive hydrogen. The polymers provide an improvement in cohesive and adhesive strength and assist in forming bonds with some of the more difficult to adhere substrates. In order to incorporate the low molecular weight polymer into the polyurethane, the respective monomers are polymerized within the urethane prepolymer or an already polymerized low molecular weight polymer is added into the urethane prepolymer. Typical monomers useful include acrylic monomers such as the C1 to C12 esters of acrylic or methacrylic acid as well as ethylenically unsaturated monomers containing moisture reactive functional groups such as silane or reactive isocyanate. Typical low molecular weight polymers are Elvacite 2013, a 64% butylmethacrylate/36% methylmethacrylate copolymer having an I.V. of 0.2.

U.S. Pat. No. 5,189,096 (Boutillier et al.) discloses a cross-linkable hot-melt adhesive composition comprising the prepolymerizate of an hydroxylated ethylene/vinyl acetate copolymer with a stoichiometric excess of a polyisocyanate. The prepolymerizate contains an effective crosslinkable amount of free isocyanate functional groups.

U.S. Pat. No. 5,506,296 (Chenard et al.) discloses a process for the preparation of a hot-melt adhesive comprising (a) melting and drying an EVA terpolymer comprising from 60 to 90% by ethylene, 10 to 40% vinyl acetate and an ethylenically unsaturated termonomer bearing at least one primary hydroxyl functional group per mole; (b) reacting the EVA terpolymer with a polyisocyanate to form a polyisocyanated EVA terpolymer; and (c) contacting the EVA terpolymer with an alcohol to obtain a moisture-curable hot-melt adhesive having a desired content of free NCO functional groups.

U.S. Pat. No. 5,866,656 (Hung et al.) discloses a solvent-free moisture curable one-part hot melt polyurethane adhesive or sealant composition which is solid at room temperature. The polyurethane composition comprises (a) 10 to 70% by weight of a urethane prepolymer having an isocyanate content of 0.25 to 15% by weight and an isocyanate index greater than 1 and up to about 3; and (b) 30 to 90% by weight of a hydroxyl containing polymer formed from ethylenically unsaturated monomers. The polymer has a number average molecular weight of 4,000 to 15,000. The polymer (b) contains sufficient hydroxyl functionality to provide an OH number of 5 to 15. The hydroxyl functionality is derived from hydroxyl substituted monomers selected from the group consisting of C1 to C12 esters of acrylic and methacrylic acids, vinyl esters, vinyl ethers, fumarates, maleates, styrene, and acrylonitrile.

While the class of adhesives in the above disclosures describe the preparation of a number of adhesive compositions, none of the above disclosures describe methods that are entirely satisfactory for preparing adhesive compositions. None of the above disclosures describe the preparation of a low cost, reactive, hot melt having increased heat and tensile properties. The present invention provides such improved hot melt compositions without the disadvantages characteristic of previously known compositions.

SUMMARY OF THE INVENTION

The present invention pertains to a solvent-free moisture curable one-part hot melt polyurethane adhesive or sealant composition which is solid at room temperature comprising, in percentages by weight of the polyurethane composition:

(a) from about 20% to about 75% of a urethane prepolymer having an isocyanate content from about 0.25% to about 15%, and an isocyanate index greater than 1 and up to about 5;

(b) from about 1% to about 66% of a reactive, hydroxyl containing, or a nonreactive polymer formed from ethylenically unsaturated monomers, the polymer having a number average molecular weight from about 4,000 to about 25,000 and selected from the group consisting of $C_1$ to $C_{12}$ esters of acrylic acid and methacrylic acids, vinyl esters, vinyl ethers, fumarates, maleates, styrene, and acrylonitrile, the polymer containing no sulfide functionality; and (c) from about 20% to about 75% of a thermoplastic resin selected from the group consisting of ethylene vinylacetate copolymers, ethylene acrylate copolymers, ethylene butylacrylate copolymers, and ethylene vinylacetate/ethylene acrylate terpolymers, wherein the ethylene vinylacetate/ethylene acrylate terpolymers have an ethylene content from about 10% to about 55%.

The present invention also pertains to a solvent-free moisture curable one-part hot melt polyurethane adhesive or sealant composition which is solid at room temperature comprising, in percentages by weight of the polyurethane composition:

(a) from about 10% to about 90% of a urethane prepolymer having an isocyanate content from about 0.25% to about 15%, and an isocyanate index greater than 1 and up to about 5; and (b) from about 5% to about 90% of a thermoplastic resin which is an ethylene vinylacetate/ethylene acrylate terpolymer, wherein the ethylene vinylacetate/ethylene acrylate terpolymer have an ethylene content from about 10% to about 55%.

DETAILED DESCRIPTION OF THE INVENTION

The present invention pertains to a solvent-free moisture curable one-part hot melt polyurethane adhesive or sealant compositions which are solid at room temperature. Applicant has found that the addition of urethane prepolymers to low molecular weight polymers formed from reactive, hydroxyl containing, or nonreactive ethylenically unsaturated monomers and thermoplastic resins selected from the group consisting of ethylene vinylacetate copolymers, ethylene acrylate copolymers, ethylene butylacrylate copolymers, and ethylene vinylacetate/ethylene acrylate terpolymers provide hot melt adhesives and gasketing compositions which are solid at room temperature, which can be readily coated at a viscosity of 3000 to 50,000 cps. at 120° C. without the need for additional tackifiers or plasticizers, and which have improved initial cohesive strength as well as improved strength after aging of the cured bond. Moreover, the adhesives exhibit these improved properties on a wide range of substrates including difficult to bond substrates.

In addition, applicant has found that the heat resistance of the hot melt polyurethane adhesive or sealant compositions of the present invention may be even further improved by utilizing an ethylenically unsaturated monomer which contains moisture reactive functional crosslinking groups. The resultant hot melt adhesive, upon curing, produces an adhesive consisting of a crosslinked polyurethane and a crosslinked ethylenically unsaturated polymer, i.e., a fully interpenetrating network (IPN) adhesive. As such, these adhesive compositions are particularly adapted for use in structural applications including those where epoxy adhesives are primarily employed.

In one embodiment, the solvent-free moisture curable one-part hot melt polyurethane adhesive or sealant composition, which is solid at room temperature, comprises, in percentages by weight of the polyurethane composition (a) from about 20% to about 75% of a urethane prepolymer having an isocyanate content from about 0.25% to about 15%, and an isocyanate index greater than 1 and up to about 5; (b) from about 1% to about 66% of a reactive, hydroxyl containing, or a nonreactive polymer formed from ethylenically unsaturated monomers, the polymer having a number average molecular weight from about 4,000 to about 25,000 and selected from the group consisting of $C_1$ to $C_{12}$ esters of acrylic acid and methacrylic acids, vinyl esters, vinyl ethers, fumarates, maleates, styrene, and acrylonitrile, the polymer containing no sulfide functionality; and (c) from about 20% to about 75% of a thermoplastic resin selected from the group consisting of ethylene vinylacetate copolymers, ethylene acrylate copolymers, ethylene butylacrylate copolymers, and ethylene vinylacetate/ethylene acrylate terpolymers, wherein the ethylene vinylacetate/ethylene acrylate terpolymers have an ethylene content from about 10% to about 55%.

The urethane prepolymers in (a) are those conventionally used in the production of polyurethane hot melt adhesive compositions. Most commonly, the prepolymer is prepared by the condensation polymerization of a polyisocyanate with a polyol, most preferably the polymerization of a diisocyanate with a diol. The polyols used include polyhydroxy ethers (substituted or unsubstituted polyalkylene ether glycols or polyhydroxy polyalkylene ethers), polyhydroxy polyesters, the ethylene or propylene oxide adducts of polyols, and the monosubstituted esters of glycerol.

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above. In accordance with one embodiment of the invention, a reactive, hydroxyl containing polymer formed from an ethylenically unsaturated monomer may be employed and may function as the polyol component, in which case, no additional polyol need be added to the reaction.

Further, small amounts of low molecular weight dihydroxy, diamino, or amino hydroxy compounds may be used such as saturated and unsaturated glycols, e.g., ethylene glycol or condensates thereof such as diethylene glycol, triethylene glycol, and the like; ethylene diamine, hexamethylene diamine and the like; ethanolamine, propanolamine, N-methvidiethanolamine and the like.

Any suitable organic polyisocyanate may be used such as, for example, ethylene diisocyanate; ethylidene diisocyanate; propylene diisocyanate; butylene diisocyanate; hexamethylene diisocyanate; toluene diisocyanate; cyclopentylene-1,3,-diisocyanate; 3-isocyanatomethyl-3,5,5-trimethylcyclohexyl isocyanate; 3-isocyanatomethyl-3,5,5-trimethylcyclohexyl isocyanate cyanurate; cyclohexylene-1,4-diisocyanate; cyclohexylene-1,2-diisocyanate; 4,4'-diphenylmethanediisocyanate; 2,2-diphenylpropane-4,4'-diisocyanate, p-phenylene diisocyanate; m-phenylene diisocyanate; xylylene diisocyanate; 1,4-naphthylene diisocyanate, 1,5-naphthylenediisocyanate; diphenyl-4,4'-disocyanate; azobenzene-4,4'-diisocyanate; diphenylsulphone-4,4'-diisocyanate; dichlorohexamethylene diisocyanate; furfurylidene diisocyanate; 1-chlorobenzene-2,4-diisocyanate; 4,4',4"-triisocyanatotriphenylmethane; 1,3,5-triisocyanato-benzene; 2,4,6-triisocyanato-toluene and 4,4'-dimethyldiphenylmethane-2,2',5,5-tetraisocyanate, and the like.

The polyisocyanate and polyol, polyamino or polymercapto components are combined in proportions so as to yield a urethane prepolymer characterized by an isocyanate content (i.e., %NCO) of from about 0.25% to about 15%, preferably to about 10%, and most preferably from 1.0% to 5%. In addition, the ratio of isocyanate equivalents to hydroxyl, amino or mercapto equivalents (known as the isocyanate index) should be greater than 1, preferably no more than about 3. By maintaining the low isocyanate index, the level of free isocyanate monomer content in the final hot melt adhesive composition can be reduced to less than about 4%. The presence of higher levels of free isocyanate has a detrimental effect on a hot melt formulation since it causes toxic fumes to be released when the adhesive is heated to application temperature. The higher levels of free isocyanate may also cause reduction in viscosity and poorer initial bond strength of the adhesive. The precise amount of the polyisocyanate used in the polymerization will depend on the equivalent weight and amount of the non-isocyanate components, and the particular polyisocyanate employed. In general, the amount of the polyisocyanate needed to achieve the isocyanate content will vary from about 5 to about 35% of the final prepolymer.

The reactive, hydroxyl containing, polymer in (b) is formed from ethylenically unsaturated monomers. The polymer has a number average molecular weight from about 4,000 to about 25,000 and is selected from the group consisting of $C_1$ to $C_{12}$ esters of acrylic acid and methacrylic acids, vinyl esters, vinyl ethers, fumarates, maleates, styrene, and acrylonitrile. The polymer contains no sulfide functionality. Preferably, the reactive, hydroxyl containing, polymer is a hydroxyl containing polymer formed from ethylenically unsaturated monomers, containing sufficient hydroxyl functionality to provide an OH number from about 5 to about 20, the hydroxyl functionality being derived from hydroxyl substituted monomers selected from the group consisting of $C_1$ to $C_{12}$ esters of acrylic acid and methacrylic acids, vinyl esters, vinyl ethers, fumarates, maleates, styrene, and acrylonitrile. More preferably, the reactive, hydroxyl containing, polymer is a hydroxyl containing polymer formed from ethylenically unsaturated monomers, containing sufficient hydroxyl functionality to provide an OH number from about 5 to about 15, the hydroxyl functionality being derived from hydroxyl substituted monomers selected from the group consisting of $C_1$ to $C_{12}$ esters of acrylic acid and methacrylic acids, vinyl esters, vinyl ethers, fumarates, maleates, styrene, and acrylonitrile. Preferably, the polymer has a Tg from about −480° C. to about 105° C., more preferably from about −15° C. to about 85° C. Preferably, the polymer has a number average molecular weight less than about 12,000. The reactive, hydroxyl containing, polymer may be any ethylenically unsaturated monomer containing hydroxyl functionality greater than one. Most commonly employed are hydroxyl substituted $C_1$ to $C_{12}$ esters of acrylic and methacrylic acids including, but not limited to hydroxyl substituted methyl acrylate, ethyl acrylate, n-butylacrylate, 2-ethylhexyl acrylate, isobutyl acrylate, n-propyl acrylate, and isopropyl acrylate, and the corresponding methacrylates. Mixtures of compatible (meth) acrylate monomers may also be used. Additional monomers that may be used include the hydroxyl substituted vinyl esters (vinyl acetate and vinyl propionate), vinyl ethers, fumarates, maleates, styrene, acrylonitrile, etc. as well as comonomers thereof.

If used as monomers, these monomers are blended with other copolymerizable comonomers and formulated so as to have a wide range of Tg values, such as between about −48° C. and about 105° C., preferably between about −15° C. and about 85° C. Suitable comonomers include the $C_1$ to $C_{12}$ esters of acrylic and methacrylic acids including, but not limited to methyl acrylate, ethyl acrylate, n-butyl acrylate, isobutyl acrylate, 2-ethylhexyl acrylate, n-propyl or isopropyl acrylate, and the corresponding methacrylates. Mixtures of compatible (meth)acrylate monomers may also be used. Additional monomers that may be used include the vinyl esters (vinyl acetate and vinyl propionate), vinyl ethers, fumarates, maleates, styrene, acrylonitrile, ethylene, etc., as well as comonomers thereof. The choice of the particular monomer(s) is largely dependent upon the desired end use of the adhesives. For example, one skilled in the art would recognize that selection of certain monomers will produce a pressure sensitive adhesive, while other monomers will give a non-pressure sensitive material. Similarly, appropriate monomers may be selected to formulate structural adhesives, conductive adhesives, etc.

The nonreactive polymer in (b) (no active hydrogen) is formed from ethylenically unsaturated monomers. The polymer has a number average molecular weight from about 4,000 to about 25,000 and is selected from the group consisting of $C_1$ to $C_{12}$ esters of acrylic acid and methacrylic acids, vinyl esters, vinyl ethers, fumarates, maleates, styrene, and acrylonitrile. The polymer contains no sulfide functionality. Preferably, the nonreactive polymer is formed from ethylenically unsaturated monomers selected from the group consisting of $C_1$ to $C_{12}$ esters of acrylic acid and methacrylic acids, vinyl esters, vinyl ethers, fumarates, maleates, styrene, and acrylonitrile. Preferably, the polymer has a Tg from about −48° C. to about 105° C., more preferably from about −15° C. to about 85° C. Preferably, the polymer has a number average molecular weight less than about 12,000. Most commonly employed are substituted $C_1$ to $C_{12}$ esters of acrylic and methacrylic acids including, but not limited to substituted methyl acrylate, ethyl acrylate, n-butylacrylate, 2-ethylhexyl acrylate, isobutyl acrylate, n-propyl acrylate, and isopropyl acrylate, and the corresponding methacrylates. Mixtures of compatible (meth)acrylate monomers may also be used. Additional monomers that may be used include substituted vinyl esters (vinyl acetate and vinyl propionate), vinyl ethers, fumarates, maleates, styrene, acrylonitrile, etc. as well as comonomers thereof.

If used as monomers, these monomers are blended with other copolymerizable comonomers and formulated so as to have a wide range of Tg values, such as between about −48° C. and about 105° C., preferably between about −15° C. and about 85° C. Suitable comonomers include the $C_1$ to $C_{12}$ esters of acrylic and methacrylic acids including, but not limited to methyl acrylate, ethyl acrylate, n-butyl acrylate, isobutyl acrylate, 2-ethylhexyl acrylate, n-propyl or isopropyl acrylate, and the corresponding methacrylates. Mixtures of compatible (meth)acrylate monomers may also be used. Additional monomers that may be used include the vinyl esters (vinyl acetate and vinyl propionate), vinyl ethers, fumarates, maleates, styrene, acrylonitrile, ethylene, etc., as well as comonomers thereof. The choice of the particular monomer(s) is largely dependent upon the desired end use of the adhesives. For example, one skilled in the art would recognize that selection of certain monomers will produce a pressure sensitive adhesive, while other monomers will give a non-pressure sensitive material. Similarly, appropriate monomers may be selected to formulate structural adhesives, conductive adhesives, etc.

The thermoplastic resin in (c) is a resin selected from the group consisting of ethylene vinylacetate copolymers, ethylene acrylate copolymers, ethylene butylacrylate copolymers, ethylene vinylacetate/ethylene acrylate terpolymers, and ethylene vinylacetate/carbon monoxide terpolymers. In one embodiment, the thermoplastic resin from (c) is an ethylene vinylacetate copolymer, and preferably the ethylene vinylacetate copolymer has a vinylacetate content from about 18% to about 60 wt.% and a melt index from about 100 to about 3100. In another embodiment, the thermoplastic resin from (c) is an ethylene acrylate copolymer, and preferably the ethylene acrylate copolymer has an acrylate content from about 14% to about 40 wt. % and a melt index from about 10 to about 900. In still another embodiment, the thermoplastic resin from (c) is an ethylene butylacrylate copolymer, and preferably the ethylene butylacrylate copolymer has a butylacrylate content from about 10% to about 40 wt. % and a melt index from about 100 to about 1000. In still yet another embodiment, the thermoplastic resin from (c) is an ethylene vinylacetate/ethylene acrylate terpolymer having an ethylene content from about 10% to about 55%., and preferably the ethylene vinylacetate/ethylene acrylate terpolymer has an acid value from about >0 to about 13 and a melt index from about 1 to about 900, and more preferably the ethylene vinylacetate/ ethylene acrylate terpolymer has an acid value from about 4 to about 8 and a melt index from about 10 to about 500.

When the thermoplastic resin in (c) is an ethylene-vinylacetate copolymer, the copolymer preferably has a vinylacetate content from about 5% to about 70.%, and more preferably from about 19% to about 40.%, by weight. When the vinylacetate content is less than about 5%, the miscibility and cohesion of the copolymer with the urethane prepolymer is inferior and provides a low final cohesive force of the adhesive composition and an instant adhesive strength too low for practical use. When the vinylacetate content is higher than about 70%, by weight, the miscibility is good but the final adhesive strength is too low for practical use.

When the thermoplastic resin in (c) is an ethylene-ethylacrylate copolymer, an ethylene-butylacrylate copolymer, or an ethylene-2-ethyl hexyl acrylate copolymer, the ethylene components in the copolymer are preferably in a range from about 70% to about 95%, by weight. When the ethylene component is less than about 70%, the final adhesive strength is low, although the miscibility with the urethane prepolymer is good, and the coating is facilitated. On the other hand, when the ethylene component is higher than about 95%, miscibility with the urethane prepolymer is too low so the cohesive force of the adhesive composition is low and the instant adhesive strength is reduced.

Suitable proportions of the three components in the hot melt adhesive or sealant composition of the present invention are as follows: (a) urethane prepolymer from about 20% to about 75%; (b) reactive, hydroxyl containing, or a nonreactive polymer formed from ethylenically unsaturated monomers from about 1% to about 66%; and (c) thermoplastic resin from about 20% to about 75%. Preferably, the suitable proportions of the three components in the hot melt adhesive or sealant composition of the present invention are as follows: (a) urethane prepolymer from about 30% to about 65%; (b) reactive, hydroxyl containing, or a nonreactive polymer formed from ethylenically unsaturated monomers from about 1% to about 55%; and (c) thermoplastic resin from about 30% to about 65%. More preferably, the suitable proportions of the three components in the hot melt adhesive or sealant composition of the present invention are as follows: (a) urethane prepolymer from about 35% to about 60%; (b) reactive, hydroxyl containing, or a nonreactive polymer formed from ethylenically unsaturated monomers from about 1% to about 50%; and (c) thermoplastic resin from about 35% to about 60%. Most preferably, the suitable proportions of the three components in the hot melt adhesive or sealant composition of the present invention are as follows: (a) urethane prepolymer from about 40% to about 55%; (b) reactive, hydroxyl containing, or a nonreactive polymer formed from ethylenically unsaturated monomers from about 1% to about 45%; and (c) thermoplastic resin from about 40% to about 55%. In another embodiment, the reactive, hydroxyl containing, or nonreactive polymer in (b) is present in amount from about 5% to about 66% and the thermoplastic resin in (c) is an ethylene vinylacetate/ ethylene acrylate terpolymer.

The hot melt adhesive or sealant composition of the present invention may further comprise a tackifying resin (tackifier). Tackifying resins are useful in modifying many different types of adhesives. The tackifiers should have good miscibility with the urethane prepolymer. They should have a softening point at 40° C. to 130° C., are solid at about 20° C., should have high tackiness, impart high cohesive force at temperatures below about 60° C., and high instant adhesive strength.

Useful tackifiers include abietic acid and pimaric acid, which are modified by heating to induce disproportionation, by reaction with alcohols to provide esterified products, and by reaction with various catalysts to hydrogenate or polymerize the material; aromatic resins such as coumarone-indene resins; chemicals such as indene or methylindene polymerized with styrene or methylstyrene to provide aromatic tackifying resins; and aliphatic hydrocarbon tackifying resins obtained by polymerizing cis- and trans-1,3-pentadiene, and isoprene and dicylopentadiene.

The hot melt adhesive or sealant composition may further comprise a rosin or rosin derivative tackifier which is esterified, hydrogenated, maleated, formaldehyde adducted, and/or phenolated. The hot melt adhesive or sealant composition may also further comprise a rosin or rosin derivative tackifier which is an alkyl or terpene phenol. The hot melt adhesive or sealant composition may still further comprise a styrenic copolymer tackifier selected from the group consisting of styrene, styrene phenol, α-methylstyrene, vinyl toluene, methoxystyrene, tertiary butyl styrene, and chlorostyrene. Sucrose benzoate is also useful.

Useful tackifiers include terpene-phenol copolymers having a molar ratio of terpene to phenol of 1.0–3.0 or abietic acid type rosins whose active hydrogens or double bonds are removed by esterification etc., in whole or in part; such as hydrogenated rosin, hydrogenated rosin glycerine ester, hydrogenated rosin pentaerythritol, disproportionated rosin, polymerized rosin, etc. The preferred terpenes are monoterpenes having 10 carbon atoms such as α-pinene, β-pinene, camphene, myrcene, dipentene, β-phellandrene, δ3-carene, sabinene, ocimene, α-terpinene and hydrogenated compounds thereof. When the preferred α-pinene is used, optimum properties are imparted in the form of miscibility, pot-life and initial and final adhesive strength. Diterpene analogs of the above monoterpenes having 20 carbon atoms are also useful.

In another embodiment, the present invention pertains to a solvent-free moisture curable one-part hot melt polyurethane adhesive or sealant composition which is solid at room temperature comprising, in percentages by weight of the polyurethane composition:

(a) from about 10% to about 90% of a urethane prepolymer having an isocyanate content from about 0.25% to about 15%, and an isocyanate index greater than 1 and up to about 5; and (b) from about 5% to about 90% of a thermoplastic resin which is an ethylene vinylacetate/ethylene acrylate terpolymer, wherein the ethylene vinylacetate/ethylene acrylate terpolymer have an ethylene content from about 10% to about 55%.

The urethane prepolymer and thermoplastic resin in this embodiment are as defined above. Suitable proportions of the two components in the hot melt adhesive or sealant composition of this embodiment are as follows: (a) urethane prepolymer from about 10% to about 90%; and (b) thermoplastic resin from about 10% to about 90%. Preferably, the suitable proportions of the two components in the hot melt adhesive or sealant composition of the present invention are as follows: (a) urethane prepolymer from about 20% to about 80%; and (b) thermoplastic resin from about 20% to about 80%. More preferably, the suitable to proportions of the two components in the hot melt adhesive or sealant composition of the present invention are as follows: (a) urethane prepolymer from about 30% to about 70%; and (b) thermoplastic resin from about 30% to about 70%. Most preferably, the suitable proportions of the two components in the hot melt adhesive or sealant composition of the present invention are as follows: (a) urethane prepolymer from about 40% to about 60%; and (b) thermoplastic resin from about 40% to about 60%.

When the adhesive is to be prepared utilizing monomeric materials, the respective monomers may be added to the polyols and polymerized therein prior to formation of the prepolymer or may be added to the already formed prepolymer and the acrylic polymerization subsequently performed. In the case of polyamino or polymercapto containing prepolymers, in-situ vinylic polymerization must be performed only in the pre-formed prepolymer. In this embodiment, when the urethane prepolymer is prepared from the condensation polymerization of a polyisocyanate and a polyol, the polyol may be the ethylene vinylacetate/ethylene acrylate terpolymer.

The reactive, hydroxyl containing, or a nonreactive ethylenically unsaturated monomer is polymerized using conventional free radical polymerization procedures to a relatively low molecular weight. For purposes of clarification herein, by "low molecular weight" we mean number average molecular weights in the range from about 4,000 to about 15,000, preferably about 12,000. Molecular weight distribution is characterized by Gel Permeation Chromatography using a PL Gel Mixed 10 micron column, a Shimadzu Model RID 6A Detector with a tetrahydrofuran carrier solvent at a flow rate of 1 milliliter per minute. The low molecular weight is obtained by careful monitoring and controlling the reaction conditions and, generally, by carrying out the reaction in the presence of a chain transfer agent such as dodecyl mercaptan. Subsequent to the polymerization of the ethylenically unsaturated monomer(s), the polyisocyanate and any additional ingredients required for the urethane prepolymer forming reaction are added and that reaction is carried out using conventional condensation polymerization procedures. In this manner, the resultant isocyanate terminated urethane prepolymer forms the reactive curing hot melt adhesive described above which contains about 10 to 70% of the urethane prepolymer and 30 to 90% of the low molecular weight hydroxyl containing polymer.

It is also possible to polymerize the low molecular weight polymer in the presence of the already formed isocyanate terminated urethane prepolymer. This method has the drawback of subjecting the prepolymer to unnecessary heating during the acrylic polymerization, heating that might result in branching, viscosity increase, depletion of needed isocyanate groups and possible gellation. Although these disadvantages are subject to control, more stringent control of conditions are required as compared to polymerization in the non-isocyanate functional urethane components. When the reaction is run in the polyol or other non-isocyanate containing component, there is also the advantage of lower reaction viscosities and reduced exposure to isocyanate vapors because of the lesser amount of heating required.

Optionally, the reactive, hydroxyl containing, or a non-reactive ethylenically unsaturated monomer may be introduced into the adhesive in the form of pre-polymerized low molecular weight hydroxyl containing polymers. In the latter case, typical polymers include unsubstituted and hydroxyl substituted butyl acrylate, unsubstituted and hydroxylated butyl acrylate/methyl methacrylate copolymers, unsubstituted and hydroxylated ethyl acrylate/methyl methacrylate copolymers, and the like, the polymers having a number average molecular weight from about 4,000 to about 2,000 and a hydroxyl number from about 5 to about 15. If used in the form of low molecular weight polymers, the polymers may be blended with the polyol prior to reaction thereof with the isocyanate or they may be added directly to the isocyanate terminated prepolymer.

The advantages of the present invention can be obtained by utilizing from about 30% to about 90% by weight of the polymer in the adhesive composition with correspondingly from about 70% to about 10% by weight of the urethane prepolymer.

The resulting hot melt adhesive compositions of the present invention are typically applied at temperatures of about 120° F. and a corresponding melt viscosity of from about 3,000 to 70,000 centipoises.

The precise formulation of the polyurethane adhesive or sealant composition of the present invention will vary depending upon the specific end use. Other ingredients may also be incorporated into the adhesive or sealant composition as dictated by the nature of the desired composition as well known by those having ordinary skill in the art. While the adhesive or sealant compositions may be used directly as described above, if desired the adhesive or sealant compositions of the present invention may also be formulated with conventional additives such as plasticizers, compatible tackifiers, catalysts, fillers, anti-oxidants, pigments, mercapto/silane adhesion promoters, stabilizers and the like. The adhesive or sealant compositions are readily prepared using methods generally known in the arts.

The resulting adhesive or sealant compositions, when appropriately formulated, may be used as hot melt adhesives in virtually any packaging application in which adhesive or sealant compositions are commonly employed with a substrate, including case and carton forming and sealing, tube winding, bag manufacture, glued lap, paper and flexible film laminating. The substrates will have applied to a portion thereof the adhesive composition. Depending on the particular application, the substrate may have substantially all of one surface coated, or may be coated on two sides. Alternately, the adhesive or sealant composition may be applied as a bead, whereby a minor portion of the substrate has applied thereto the adhesive. One skilled in the art, having the knowledge of the present specification, will readily ascertain those applications in which the use of the inventive adhesive or sealant compositions would be advantageous. Any conventional method of applying the adhesive or sealants to the particular substrates may be employed. These methods are well known in the field of adhesives or sealants.

Throughout this application, various publications have been referenced. The disclosures in these publications are incorporated herein by reference in order to more fully describe the state of the art.

Throughout this application, applicant will suggest various theories or mechanisms by which applicant believes the components in the adhesive compositions function together in an unexpected manner to provide unique hot melt agents. While applicant may offer various mechanisms to explain the present invention, applicant does not wish to be bound by theory. These theories are suggested to better understand the present invention but are not intended to limit the effective scope of the claims.

The present invention can be further illustrated by the following examples of preferred embodiments thereof, although it will be understood that these examples are included merely for purposes of illustration and are not intended to limit the scope of the invention unless otherwise specifically indicated.

EXAMPLES

In these Examples, the following series of tests have been developed to characterize the adhesives of this invention and measure their effectiveness.

Test Procedures
Molecular Weight—Condition of GPC Characterization
  Model: Water Model 712 Wisp Autosampler
  Column: PL Gel, Mixed 10 u
  Detector: Shimadzu Model RID 6A
  Injection Volume: 50 $\mu$UL
  Flow Rate: 1 ml/minute
  Temperature: 25° C.
  Solvent: Tetrahydrofuran
  Calibration: Polystyrene Standard
  Sample Conc. 10 mg/4ml
Open Time (Bond Range)
  Coated 5 mil adhesive on the flat surface and measured the number of minutes during which the adhesive surface remained tacky.

Dynamic Peel
  Coated 5 mil thickness adhesive on a hot (250° F.) glass surface. Then quickly placed a vinyl strip (325 mm×16 mm×0.007 inch) in the center of adhesive film. A 103 gram weight was placed onto the hole-punched end of the vinyl strip. Under ambient conditions the temperature of the bonded composite falls. At one minute intervals, the temperature is recorded as is the length of dislocatation of the ruptured bond.

Tensile and Elongation of Cured Free Films
  This test measures the strength of the film and its elasticity. The tensile strength and degree of elongation are related to the utility of a material as an adhesive. In general, a material that possesses high tensile strength and appropriate elongation will show better adhesive performance than a material which is poor in one or both categories. In this test, films were cast from the melt on a low energy surface at approx. 3–5 mils thickness. (Films in this range had to be used as heavier films developed excessive voids on curing.) The films were cured by exposing them to the atmosphere, in a constant temperature room with 22° C. and 50% R.H. for one week Adhesion Test
  Samples were prepared using various flexible substrates by coating the substrate with 1.0 mil of molten adhesive and immediately laminating to a ⅜" particle board by subjecting the lamination to 10 minutes in a cold press at approx. 5 psi. pressure. All samples were allowed 1 week to cure or crosslink. They were then subjected to a 90° C. peel test at a withdrawal rate of 12 inches per minute.

Heat Resistance
  Since most hot melts are thermoplastic and deform or flow when subjected to temperatures above 82° C., a series of shear tests at elevated temperatures were devised to measure resistance to flow or deformation at higher temperatures, up to 175° C. In this test a lap shear of 5 mil bare aluminum foil to ⅜" particle board with an adhesive application 1 mil is used. All samples were cured 1 week. The samples were placed in a circulating air oven at 108° C. with a load of 1 kilogram per sq./inch. They were allowed to remain at this temperature for 15 min., then the temperature was elevated to 120° C. and observed for 15 min. and then again the temperature was elevated at regular intervals until failure was observed.

Green Strength
  This test measures the bond immediately after application and bonding. This is important as it tests the strength of the uncured, material prior to curing. Sufficient green strength must be present to hold substrates together when combined, and while the cure develops with ambient moisture. Green strength or immediate bond strength prior to cure as well as rate of cure, is very important for the fabrication or lamination process prior to full cure. In this test, the adhesive samples in molten condition at 120° C. were coated at exactly 1.0 mil thickness on 2 mil (1 inch width) Mylar film and immediately nipped to 5 mil aluminum foil. The resultant lamination of Mylar/Adhesive/Foil was then peeled immediately, after the indicated times using an Instron tester at 12 inch/min.

Instant Adhesive Strength
  Polypropylene films each having a length of 10 cm and a width of 2 cm were separately placed on separate stainless steel plates each heated at 30° C. and 60° C. respectively. The test adhesive composition was coated on the film at a rate of 20 g/m2 and 1 cm of the edge of one film was plied onto 1 cm of the edge of the other film and the bonded films were immediately (within 5 seconds) peeled off. The adhesive strength at the time of peeling off per 2 cm width was measured by a spring scale.

Final Adhesive Strength

A multi-layered sheet bonded with the test adhesive composition was cured 20° C. and 65% relative humidity for 7 days and the sheet was kept at the measuring temperature for 2 hours and then the adhesive strength was measured by peeling off at a rate of pulling of 200 mm/min. to 90° by using Instrone-type autograph tension tester.

Viscosity at Melting

Viscosity of melted adhesive composition was measured by using a rotary viscosimeter (VT-02 type) (manufactured by Rion Co.) with No. 2 rotor.

In these examples, the following abbreviations are used.

MMA=Methyl methacrylate

BMA=Butyl methacrylate

BA=Butyl acrylic acid

HEMA=Hydroxy ethyl methacrylate

MAA=Methyl acrylic Acid

EVA=Ethylene vinyl acetate

Ethylene Terpolymer, Ml 500=Ethylene vinyl acetate acrylic acid

EXAMPLE 1

A 500 milliliter reaction vessel was set up with an addition port, vacuum port, thermometer, stirrer, and heating mantel. The ingredients of the reaction consisted of the following:

| | |
|---|---|
| 1. Polypropylene Glycol, 2000 MW | 81 |
| 2. MMA/BMA/HEMA/MAA (Acrylic) | 35 |
| 3. Rosin Ester, 105 R & B S.P. | 85 |
| 4. EVA, MI 2500, 28% VA | 60 |
| 5. Ethylene Terpolymer, MI 500 | 23 |
| 6. Methylene bis phenyl diisocyanate | 40 |
| 7. Catalyst | 1 |

The reaction vessel was charged with the ingredients 1, 2, and 3, and the temperature was raised to 2500 F. When the mixture became molten, agitation was provided until homogeneity was achieved. Ingredients 4 and 5 were then added and vacuum of 0 inches of Hg was applied. Vacuum, stirring, and heating were maintained for 2 hours. Ingredient 6 was then charged and held for an additional 3 hours at the the temperature; vacuum was re-applied an hour after the charge. Ingredient 7 was then charged and vacuum, stirring and temperature were maintained for one. additional hour. The properties of the product were as follows.

Properties:

| | |
|---|---|
| % Ethylene based polymers | 13% |
| % Prepolymer | 55 |
| % Isocyanate Groups | 1.9 |
| Viscosity (cp) at 250 F | 8600 |
| Uncured Heat Resistance | 36° C. |
| Cured Heat Resistance | 160° C. |

EXAMPLE 2.

The procedure of Example I was repeated except that half of the rosin ester was replaced with a 103 R&B S.P. aliphatic-aromatic tackifying resin. The viscosity at 250 OF was reduced to 5750 cp, the % isocyanate group was increased to 2.3%; the uncured creep resistance became 31° C.

| | |
|---|---|
| 1. Polypropylene Glycol, 2000 MW | 81 |
| 2. MMA/BMA/HEMA/MAA (Acrylic) | 35 |
| 3. Rosin Ester, 109 R & B S.P. | 42.5 |
| 4. Hydrogenated C5–C9, 103 R & B S.P. | 42.5 |
| 5. EVA, MI 2500 | 60 |
| 6. Ethylene Terpolymer, MI 500 | 23 |
| 7. Methylene bis phenyl diisocyanate | 40 |
| 8. Catalyst | 1 |

The properties of the product were as follows.

Properties:

| | |
|---|---|
| % Ethylene based polymers | 13% |
| % Prepolymer | 55 |
| % Isocyanate Groups | 2.3 |
| Viscosity (cp) at 250 F | 5750 |
| Uncured Heat Resistance | 31° C. |
| Cured Heat Resistance | 160° C. |

EXAMPLE 3.

In this example the ingredients of the reaction consisted of the following:

| | |
|---|---|
| 1. MMA/BA/HEMA, | 175 |
| 2. Rosin Ester, 109 R & B S.P. | 53 |
| 3. EnBA, MI 900, 35% nBA | 53 |
| 4. Isophorone diisocyanate | 19 |
| 5. Catalyst(s) | 2 |

The reaction vessel was charged with the ingredients 1, 2, and 3, and the temperature was raised to 250° F. When the mixture became molten agitation was provided until homogeneity was achieved. A vacuum of 0 inches of Hg was then applied and maintained for 2 hours. Ingredient 4 was then charged and held for an additional 3 hours at the said temperature; vacuum was re-applied an hour after the charge. Ingredient 5, a combination of curing catalysts, were then charged. Vacuum, stirring and the temperature were maintained for one additional hour.

Properties:

| | |
|---|---|
| % Ethylene based polymers | 17.5% |
| % Prepolymer | 64 |
| % Isocyanate Groups | 2.1 |
| Viscosity (cp) at 250 F | 8,875 |
| Uncured Heat Resistance | 39° C. |
| Cured Heat Resistance | 160° C. |

EXAMPLE 4

This example is provided to illustrate the production of a hot melt adhesive according to U.S. Pat. No. 3,931,077 using a blend of polyurethane pre-polymer, a thermoplastic resin and a tackifier.

| | |
|---|---|
| 1. Polypropylene Glycol, 2000 MW | 46 |
| 2. Polypropylene Glycol, 1000 MW | 46 |
| 3. Rosin Ester, 109 R & B S.P. | 92 |
| 4. EVA, MI 140 W, 28% VA | 71 |
| 5. EVA, MI 55, 40% VA | 14 |
| 6. Methylene bis phenyl diisocyanate | 25 |

Properties:

| | |
|---|---|
| % Ethylene based polymers | 31.6% |
| % Prepolymer | 39 |
| % Isocyanate Groups | 5.6 |
| Viscosity (cp) at 250 F | 7,950 |
| Uncured Heat Resistance | <23° C. |
| Cured Heat Resistance | 120° C. |

While a number of embodiments of this invention have been represented, it is apparent that the basic construction can be altered to provide other embodiments which utilize the invention without departing from the spirit and scope of the invention. All such modifications and variations are intended to be included within the scope of the invention as defined in the appended claims rather than the specific embodiments which have been presented by way of example.

I claim:

1. A solvent-free moisture curable one-part hot melt polyurethane adhesive or sealant composition which is solid at room temperature comprising, in percentages by weight of the polyurethane composition:
    (a) from about 10% to about 90% of a urethane prepolymer having an isocyanate content from about 0.25% to about 15%, and an isocyanate index greater than 1 and up to about 5; and
    (b) from about 5% to about 90% of a thermoplastic resin which is a terpolymer comprising a polymer of ethylene, vinyl acetate and acrylic acid, wherein the terpolymer has an ethylene content from about 10% to about 55% and an acid value from about >0 to about 13 and a hot melt index from about 1 to about 900.

2. The hot melt adhesive or sealant according to claim 1, wherein the urethane prepolymer from (a) is prepared from the condensation polymerization of a polyisocyanate and a polyol.

3. The hot melt adhesive or sealant according to claim 2, wherein the polyisocyanate in the urethane prepolymer is selected from the group consisting of ethylene diisocyanate; ethylidene diisocyanate; propylene diisocyanate; 3-isocyanatomethyl-3,5,5-trimethylcyclohexyl isocyanate; 3-isocyanatomethyl-3,5,5-trimethylcyclohexyl isocyanate cyanurate; butylene diisocyanate; hexamethylene diisocyanate; toluene diisocyanate; cyclopentylene-1,3,-diisocyanate; cyclohexylene-1,4-diisocyanate; cyclohexylene-1,2-diisocyanate; 4,4'-diphenylmethane diisocyanate; 2,2-diphenylpropane-4,4'-diisocyanate; p-phenylene diisocyanate; m-phenylene diisocyanate; xylylene diisocyanate; 1,4-naphthylene diisocyanate; 1,5-naphthylene diisocyanate; diphenyl-4,4'-diisocyanate; azobenzene-4,4'-diisocyanate; diphenylsulphone-4,4'-diisocyanate; dichlorohexamethylene diisocyanate; furfurylidene diisocyanate; 1-chlorobenzene-2,4-diisocyanate; 4,4',4"-triisocyanatotriphenylmethane; 1,3,5-triisocyanatobenzene; 2,4,6-triisocyanato-toluene; and 4,4'-dimethyldiphenylmethane-2,2',5,5-tetraisocyanate.

4. The hot melt adhesive or sealant according to claim 2, wherein the polyol is selected from the group consisting of polyalkylene ether glycols, polyhydroxy polyalkylene ethers, polyhydroxy polyesters, ethylene and propylene oxide adducts of polyols, and esters of glycerol.

5. The hot melt adhesive or sealant composition according to claim 1, wherein the terpolymer has an acid value from about 4 to about 8 and a melt index from about 10 to about 500.

6. The hot melt adhesive or sealant composition according to claim 1, further comprising a rosin or rosin derivative tackifier which is esterified, hydrogenated, maleated, formaldehyde adducted, and/or phenolated.

7. The hot melt adhesive or sealant composition according to claim 1, further comprising a rosin or rosin derivative tackifier which is an alkyl or terpene phenol or sucrose benzoate.

8. The hot melt adhesive or sealant composition according to claim 1, further comprising a styrenic copolymer tackifier selected from the group consisting of styrene, styrene phenol, α-methylstyrene, vinyl toluene, methoxystyrene, tertiary butyl styrene, and chlorostyrene.

9. The hot melt adhesive or sealant composition according to claim 1, wherein the urethane prepolymer in (a) is present in amount from about 30% to about 65%.

10. The hot melt adhesive or sealant composition according to claim 1, wherein the thermoplastic resin in (b) is present in amount from about 30% to about 65%.

* * * * *